US012719671B1

(12) United States Patent
Cohen-White

(10) Patent No.: US 12,719,671 B1
(45) Date of Patent: Aug. 25, 2026

(54) CONSENT CHAIN CERTIFICATION

(71) Applicant: Noreen Cohen-White, Murfreesboro, TN (US)

(72) Inventor: Noreen Cohen-White, Murfreesboro, TN (US)

( * ) Notice: Subject to any disclaimer, the term of this patent is extended or adjusted under 35 U.S.C. 154(b) by 0 days.

(21) Appl. No.: 19/235,293

(22) Filed: Jun. 11, 2025

(51) Int. Cl.
*H04L 9/32* (2006.01)
*H04L 9/08* (2006.01)

(52) U.S. Cl.
CPC .......... *H04L 9/0861* (2013.01); *H04L 9/0891* (2013.01); *H04L 9/3213* (2013.01); *H04L 9/3231* (2013.01); *H04L 9/3263* (2013.01)

(58) Field of Classification Search
CPC ... H04L 9/0861; H04L 9/0891; H04L 9/3213; H04L 9/3231; H04L 9/3263
See application file for complete search history.

(56) References Cited

U.S. PATENT DOCUMENTS 7,548,620 B2 * 6/2009 Popp .................... H04L 9/0825 380/282
10,516,538 B2 12/2019 Fielding et al.
10,587,609 B2 3/2020 Ebrahimi et al.
10,644,889 B1 5/2020 Govindaraj et al.
10,949,636 B2 3/2021 Govindaraj et al.
11,316,699 B2 4/2022 Uhr et al.
11,531,746 B2 12/2022 Dewost
11,550,931 B1 1/2023 Dintchev et al.
11,947,644 B2 * 4/2024 Iordache ................ G06V 10/82
2018/0285544 A1 * 10/2018 Chang .................. G06V 40/172
2019/0319948 A1 10/2019 Triola et al.
2021/0064726 A1 * 3/2021 Mannby .............. H04L 63/0861
2021/0390196 A1 * 12/2021 Lavine .................. H04L 63/102
2022/0292517 A1 * 9/2022 Mimassi ................. G06F 21/32
2023/0153413 A1 * 5/2023 Karlsson ............... G06F 21/335 726/4
2023/0297716 A1 * 9/2023 Bella .................. G06F 16/2379 726/1
2023/0396618 A1 * 12/2023 Kumar .................. H04L 63/105
2024/0129130 A1 4/2024 Semenovskiy et al.
2025/0023742 A1 1/2025 Schlicher et al.
2025/0106031 A1 3/2025 Parthe et al.

FOREIGN PATENT DOCUMENTS

EP 0771499 B1 9/2005

* cited by examiner

*Primary Examiner* — Ali S Abyaneh
(74) *Attorney, Agent, or Firm* — Haynes and Boone, LLP

(57) ABSTRACT

A method is disclosed for generating a signature token by receiving at least one consent artifact from a user, validating the user's identity based on a plurality of identity verification artifacts and the consent artifact, generating a consent certificate that associates a verification request with the identity and consent artifacts, and applying a binding operation to produce the signature token.

20 Claims, 3 Drawing Sheets

CONSENT CHAIN CERTIFICATION

TECHNICAL FIELD

This disclosure relates to digital verification and consent systems.

BACKGROUND

Electronic digital signature systems often rely on basic identity checks, static audit trails, or limited biometric inputs. These approaches may not fully capture or preserve the context, intent, or conditions under which consent is given, particularly in remote or asynchronous environments. Methods and systems which improve the capture, verification, and auditability of consent using enhanced contextual and biometric information may be desirable.

SUMMARY

In one aspect, in general, a method for generating a signature token for a consent event, the method including: receiving at least one consent artifact from a user; validating an identity of the user based on a plurality of identity verification artifacts and the at least one consent artifact; generating a consent certificate that associates a verification request, the plurality of identity verification artifacts, and the at least one consent artifact; and applying a binding operation to produce the signature token.

Aspects can include one or more of the following features.

Generating the consent certificate includes associating a consent description.

The consent description includes metadata identifying a context of a user's consent.

The signature token is used to prove chain of custody.

The binding operation includes a cryptographic operation.

The cryptographic operation includes a zero-knowledge proof.

The at least one consent artifact contains at least one biometric artifact.

Recording a revocation entry that invalidates or limits the use of the signature token.

The plurality of identity verification artifacts includes environmental information.

Validating the identity includes computing a confidence score using a trained neural network.

In some aspects, the techniques described herein relate to a method, wherein the at least one consent artifact includes behavioral indicators demonstrating consent. In one aspect, in general, a method for verifying a user consent, the method including: receiving a signature token associated with a verification request; extracting a consent certificate from the signature token; validating the consent certificate by applying a cryptographic verification operation to the signature token; and confirming the user consent to the verification request based on the consent certificate.

Aspects can include one or more of the following features.

In some aspects, the techniques described herein relate to a method further including verifying an identity of a user based on a plurality of identity verification artifacts and at least one consent artifact.

The verification request includes a type of consent.

The verification request includes a scope of consent.

The consent certificate includes an intent strength score.

Confirming the user consent includes validating a time-stamped declaration contained in the consent certificate.

In one aspect, in general, a system for generating a signature token, including: an intake module configured to receive a verification request and a plurality of identity verification artifacts associated with a user; a consent module configured to capture at least one consent artifact from the user, the at least one consent artifact including at least one biometric artifact; a validation module configured to authenticate the user based on the plurality of identity verification artifacts and the at least one consent artifact; a certificate module configured to generate a consent certificate associating the verification request, the plurality of identity verification artifacts, and the at least one consent artifact; and a cryptographic module configured to secure the consent certificate to produce the signature token.

Aspects can include one or more of the following features.

The at least one consent artifact includes an environmental artifact.

The consent module is further configured to prompt a consent event.

Aspects can have one or more of the following advantages.

The disclosed techniques aim to provide a robust, context-rich framework for capturing and validating digital consent in a way that enhances trust, security, and legal enforceability. By generating a signature token that encapsulates not just a user's identity, but also the full circumstances of the consent event, including biometric, behavioral, environmental, and temporal data, these methods enable the creation of a comprehensive, verifiable consent certificate. This certificate can serve as a tamper-evident, cryptographically bound artifact that reflects not merely that consent was given, but how, when, where, and under what conditions it was given.

A key advantage of the disclosed techniques lies in their use of multimodal data to establish and preserve user intent. Traditional systems may authenticate a user's identity, but they often stop short of capturing the richness of the consent context. In contrast, the present techniques integrate voice recordings, video declarations, facial recognition vectors, environmental metadata, behavioral analytics, and other information into a single consent certificate. This enables downstream consumers such as notaries, regulators, or relying parties to validate consent independently and with greater evidentiary weight, even in the absence of ongoing access to the user or the original platform. As a result, consent becomes portable, dispute-resistant, and legally meaningful across jurisdictions and industries.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
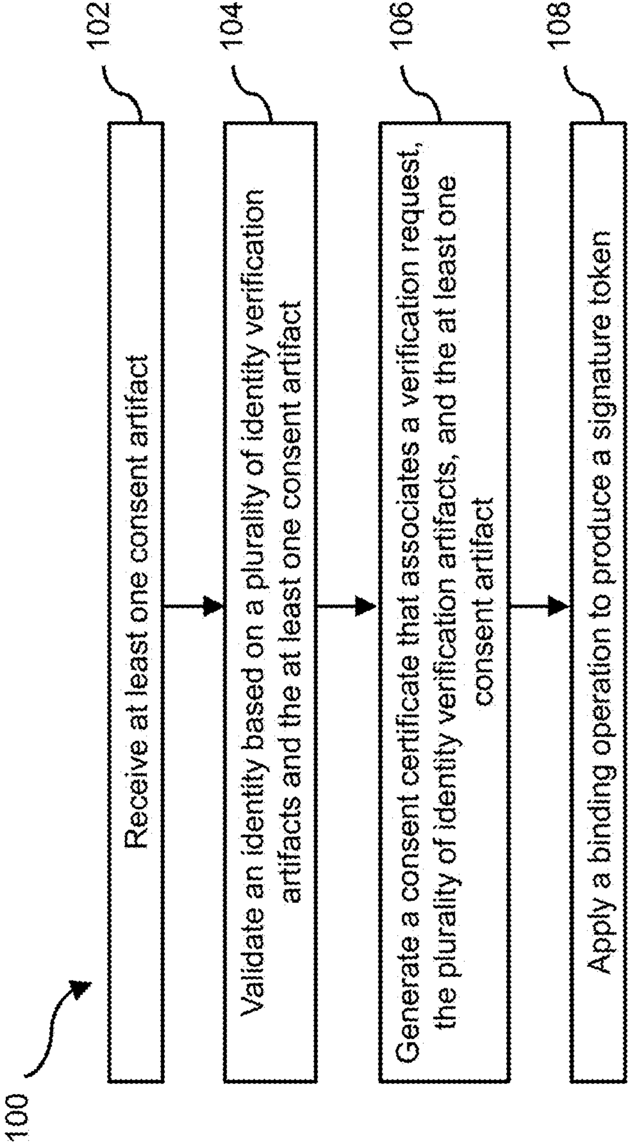
FIG. 1 is a block diagram of generating a signature token in accordance with some embodiments of the disclosure.

In digital transactions and remote interactions, verifying that a user has provided authentic, informed consent remains a complex challenge. Many current systems focus primarily on identity verification, such as confirming a login or scanning a government-issued ID. While such techniques may establish that a person was present or authorized, they often fall short in proving how, when, and under what conditions consent was given. This limitation is especially pronounced in environments where parties are not co-located or where actions must be validated long after the original interaction occurred.

The present techniques introduce a structured method for capturing and preserving user consent through the generation of a consent certificate. A consent certificate is a singular, self-contained data object that (typically, cryptographically) binds multiple components of a consent event. These components may include consent artifacts (such as timestamped videos, voice declarations, behavioral indicators), identity verification artifacts (including biometric hashes, ID scans, or device fingerprints), and contextual metadata (such as time, location, or device attributes). By combining these elements into one cohesive object, the consent certificate encapsulates all data necessary to later prove that a specific user provided valid consent for a particular request, under specific conditions.

The system may capture this data through various modules configured to prompt, receive, and validate multimodal input from the user. For example, a user may be asked to state their name and purpose for consent on camera, while simultaneously verifying facial features and capturing environmental data such as IP address and device ID. This information is then processed to generate the consent certificate, which is cryptographically sealed and associated with a signature token. This token may be transmitted or stored as proof that a consent event took place and may later be verified without the need to re-authenticate the user or rely on the original platform's infrastructure.

This approach enables a broad range of use cases. In online notarization, for example, the consent certificate may serve as a trusted record showing that a signer not only appeared before the notary but did so with documented intent, verified identity, and in a compliant location. For chain of custody scenarios, such as handling sensitive data or legal evidence, the certificate may verify that each transfer or handoff was acknowledged and authorized by a verified party. In third-party consent validation, such as in healthcare or data sharing platforms, the consent certificate allows organizations to independently confirm that consent was obtained from the correct person under valid conditions without exposing personally identifiable information or relying on centralized trust models.

The cryptographic and data-binding techniques used in generating the consent certificate also support privacy and auditability. While the certificate may contain rich contextual data, it can be designed for selective disclosure, allowing only the relevant aspects to be shared or validated depending on the application. Moreover, because each certificate is event-centric rather than user-centric, it becomes a durable artifact that can be reused, exported, or independently verified at any time, without requiring persistent user accounts or re-authentication. This flexibility makes the system well-suited for regulated industries, cross-border workflows, or any setting where provable, context-rich digital consent is required.

A consent event is a discrete, affirmative interaction in which a user authorizes a specific action, transaction, or request, with sufficient information to later demonstrate that the agreement was intentional, informed, and attributable. A valid consent event is characterized by three core elements: (1) a clearly defined request or proposition presented to the user at the moment of decision; (2) an affirmative indication of intent to agree, such as a verbal declaration, gesture, biometric input, or deliberate interaction; and (3) verifiable linkage to the user's identity. Consent events differ from generic identity checks, which verify who a person is without indicating intent, and from document execution tools, which record signatures but often omit the immediate context or conditions under which the agreement occurred. A consent event framework ensures that the resulting record captures not just that agreement occurred, but enough evidence to meaningfully demonstrate who agreed, to what, and under what circumstances.

Referring to FIG. 1, a method is provided for generating a signature token that represents a verifiable record of user consent. The method 100 begins with receiving 102 at least one consent artifact, typically from a user. The consent artifact may include a signed document, a timestamped video declaration, a voiceprint derived from a verbal statement, a digitally drawn or typed signature, or behavioral indicators such as dwell time or gesture-based affirmations. In some cases, multiple consent artifacts may be captured in parallel to ensure multimodal confirmation. Next, an identity (again, typically of the same user) is validated 104 based on a plurality of identity verification artifacts, which may include scanned government-issued IDs, facial recognition vectors, voice biometrics, device fingerprints, or location metadata. The method 100 may incorporate third-party identity verification services and use both active and passive liveness detection to further increase confidence in the authentication process. A consent certificate is then generated 106 that associates a verification request—such as a request to sign, authorize, or approve a document or transaction—with the collected identity verification artifacts and the consent artifacts. This certificate may include metadata such as the scope, duration, or purpose of the consent, and may be formatted as a portable, cryptographically signed data object. Finally, a binding operation is applied 108 to secure the consent certificate, producing a signature token. The binding operation may be implemented using hashing, digital signatures, asymmetric encryption, zero knowledge proofs, or other cryptographic means to ensure that the token is tamper-evident and uniquely tied to the specific consent event. In alternative implementations, the signature token may also include audit trails, session identifiers, or be stored on a distributed ledger to facilitate independent validation.

Generating 106 a consent certificate comprises constructing a structured, machine-readable data object that binds together the key elements of the consent process in a verifiable and tamper-evident way. This operation follows the receipt of a verification request, one or more identity verification artifacts, and at least one consent artifact. The generation step is performed programmatically and typically occurs server-side within a dedicated certificate generation module, although in some implementations, portions of the process may be distributed across trusted services or client-side logic.

The generation 106 may begin by initializing a certificate data object, such as a dictionary or map structure in memory, using a predefined schema. This schema may define the expected keys or fields required for a valid consent certificate. These fields may include a reference to the verification request, one or more identity verification artifact inputs, and at least one consent artifact. The system may use a structured data format such as JSON, Protocol Buffers, or CBOR for internal representation, allowing for deterministic serialization and later signature.

The term "associating" as used in this context refers to the process of binding the verification request, identity verification artifacts, and consent artifact(s) into a data structure, such that each is logically tied to the others within the certificate. This association may be implemented by inserting these components as named fields in the certificate object. For example, the verification request may be represented as a secure hash or canonical string stored in a "verification_request" field. Identity verification artifacts and consent artifacts may likewise be stored in keyed fields, such as "identity_artifacts" and "consent_artifacts", which may themselves contain nested substructures or references. By embedding these components into a unified data model, the method ensures that any later parsing or validation will treat them as a single unit.

Once the fields have been populated, the certificate may be serialized in a canonical format. Canonical serialization ensures that the byte-for-byte representation of the certificate is consistent across platforms, which is essential for digital signing or hashing. For example, if JSON is used, field ordering may be normalized, and any optional or null fields may be handled according to a schema definition, preventing discrepancies during later verification or hashing stages due to encoding ambiguities.

Following serialization, a cryptographic digest or digital signature may be computed over the serialized certificate. This may be done using a hash function (e.g., SHA-256) and/or a digital signature algorithm (e.g., ECDSA or Ed25519) with a private signing key held by the issuing platform. This cryptographic operation may occur as part of the certificate generation 106 or may be deferred until the applying 108 the binding operation. In either case, the resulting hash or signature is stored alongside or embedded into the consent certificate. At this point, the certificate is ready to be embedded into a signature token or exported for downstream verification. Although the certificate may include additional fields such as timestamps, issuer metadata, or version identifiers, the core of the generation 106 is the technical operation of assembling and serializing a structured object that logically binds the verification request, identity artifacts, and consent artifacts into an integrity-protected unit.

In various embodiments, the signature token generated by the method 100 includes the result of applying 108 a binding operation to a consent certificate. The token may be a structured, serialized digital object that encapsulates (i) the consent certificate generated 106 and (ii) the cryptographic output of the applying 108 the binding operation, such as a digital signature or secure hash. The consent certificate itself may be serialized in a canonical format (e.g., JSON or CBOR) to ensure consistency across platforms, and the applying 108 a binding operation may involve signing the certificate using a private key held by the issuing platform. The resulting token may be self-contained or modular, depending on whether the certificate is embedded directly in the token or stored separately and referenced by the token. In either case, the signature token serves as a tamper-evident, verifiable artifact that proves a consent event occurred under authenticated, auditable conditions.

The token format may support a variety of deployment models. In minimal implementations, the token may be encoded as a base64 string containing both the serialized certificate and the associated signature. This compact format is suitable for environments where bandwidth, storage, or transport simplicity are primary concerns. In higher-assurance or enterprise implementations, the token may be structured as a nested object with clearly delineated fields, such as "certificate", "signature", "certificate_hash", and optional "verification metadata". The token may also include metadata such as issuance timestamps, certificate versioning, or identifiers for public key lookup, enabling verifiers to confirm both the structure and the legitimacy of the signature. The inclusion of the cryptographic output of applying 108 a binding operation ensures that any post-generation modification to the certificate will invalidate the token's signature during later verification.

In some embodiments, the method may support decentralized or blockchain-based storage of signature tokens or their associated certificate hashes. For example, after applying 108 a binding operation, the method may compute a cryptographic hash of the token or the certificate and submit that hash to a public or permissioned blockchain as a transaction. This creates a publicly auditable timestamp and immutability guarantee, allowing any verifier to confirm that a specific certificate existed at a specific point in time without revealing the underlying contents. The signature token may include a reference to the blockchain transaction ID, contract address, or block number, enabling lightweight verification even across organizational boundaries. This is particularly useful in legal, cross-jurisdictional, or regulatory environments where long-term proof of integrity and timestamping are essential.

The signature token is designed to be interoperable and extensible, accommodating future features and evolving regulatory requirements. Fields may include schema identifiers or version tags to support compatibility with future token formats or validation workflows. In selective disclosure scenarios, the token may carry a Merkle root representing the certificate contents, allowing third parties to validate specific fields without needing access to the full certificate. In cases where field-level encryption or zero-knowledge proofs are used, the token may contain commitments or validation instructions indicating how to interpret or verify disclosed components. The token format ensures that consent captured via the method remains portable, machine-verifiable, and legally meaningful across contexts—whether it's attached to a document, transmitted via API, or anchored to a public ledger.

The consent certificate or resulting signature token may be output or stored in multiple formats to accommodate differing regulatory, interoperability, and usability requirements. These formats may include raw JSON or CBOR structures for machine-readable integration; PDF documents with embedded digital signatures, timestamps, or scannable QR codes for human-legible presentation; and NFT-style tokens for blockchain-based custody or issuance in high-value or ceremonial events (e.g., legal instruments, academic certifications). The system may support secure cloud storage using encrypted object stores (e.g., S3 with key wrapping) or local-only storage for privacy-critical workflows where external persistence is restricted. In regulated or domain-specific contexts, the system may also export or encode consent certificates using interoperable industry schemas such as HL7 or FHIR (for healthcare) or DID-compliant formats (for decentralized identity). These output and storage variants may be selected dynamically based on organizational policy, jurisdictional constraints, or relying party requirements, and are designed to maintain verifiability and portability regardless of format.

In some embodiments, generating 106 the consent certificate may further include associating a consent description that characterizes the nature of the user's consent. A consent description is any data that provides additional context to a consent event. This description may be generated dynamically during the consent session and may include information such as the purpose of the consent, the type of action being authorized (e.g., approval, acknowledgement, agreement), or references to the specific document or transaction to which the consent applies. The consent description may be stored as metadata within the consent certificate and may be rendered in a human-readable or machine-readable format.

In some embodiments, the consent description may include metadata identifying the context of a consent event, such as the time of day, presence of other parties, geographic location, user interface prompts presented during the session, and system conditions at the time of interaction. For instance, the system may log whether the user was on a mobile or desktop device, whether they were prompted with a video or textual explanation of the terms, and whether any accessibility features were enabled. These contextual indicators may help demonstrate that consent was informed and situationally appropriate.

In some embodiments, the signature token generated by the method may be used to prove a chain of custody for a digital object or transaction. For example, when a document or dataset is transferred between parties, each transfer may be accompanied by a consent certificate signed by the initiating party. By validating each certificate along the path of the transaction, a verifiable trail can be established, showing that each participant in the chain explicitly acknowledged and consented to the handoff or access, thus improving the traceability and trustworthiness of digital records.

To implement the chaining process, each signature token may include a field referencing a previous consent event—such as a cryptographic hash of the earlier consent certificate or a unique token identifier—thereby forming a verifiable sequence of linked tokens. When a digital object (e.g., a document, dataset, or authorization) is handed off or reassigned, the method generates a new verification request that captures the intent and scope of the new interaction. A fresh consent artifact is then collected from the new participant, and a consent certificate is generated that includes a reference to the previous token. This ensures that each new consent is cryptographically bound not only to the current transaction context, but also to the history of prior consents and transfers, forming a durable and auditable chain of custody.

During downstream validation, a relying party may traverse this chain by verifying each signature token in sequence—checking cryptographic signatures, confirming referenced hashes, and validating that each consent certificate links to a legitimate predecessor. Because each link in the chain independently satisfies the method's verification and binding requirements, the chain of custody can be reconstructed and confirmed without continuous access to a central authority or platform. This chaining mechanism supports legally meaningful audit trails across domains such as notarization, financial approvals, or delegated data sharing, where it is critical to prove not only that consent occurred, but that it persisted through multiple controlled transitions.

In some embodiments, the binding operation used to produce the signature token may include a cryptographic operation such as generating a digital signature using a private key, computing a secure hash of the consent certificate, or applying a timestamping algorithm to ensure temporal integrity. These cryptographic methods help ensure that the certificate has not been altered after creation and that it can be uniquely associated with the user and consent event.

In some embodiments, the cryptographic operation may incorporate a zero-knowledge proof (ZKP) to allow third-party validators to confirm that valid consent was given without revealing the underlying personal data. For instance, the system may prove that the consent certificate includes a verified identity match and valid timestamp without disclosing the actual biometric hash or location data. This provides an additional layer of privacy while preserving verifiability.

ZKPs are cryptographic methods that allow one party (the prover) to demonstrate to another (the verifier) that a certain statement is true, without revealing any additional information beyond the validity of the claim. In the context of consent systems, ZKPs may be used to prove that a user has successfully passed identity verification, agreed to a document, or satisfied other compliance conditions without exposing the user's biometric data, personal identifiers, or even the underlying document itself. By using this procedure, ZKPs limit the potential misuse of the user's data by a third-party, either accidentally (such as in a data leak) or intentionally (such as identity theft). This is particularly valuable in privacy-sensitive domains such as healthcare, finance, or legal services, where trust in the process must be maintained while limiting exposure of the data. ZKPs can thereby support third-party verification, regulatory compliance, or cross-jurisdictional review without disclosing the contents of the consent certificate.

In one embodiment, a ZKP may be implemented to prove that a biometric match occurred between a user's live facial scan and their ID photo without revealing the facial data itself. During the validation step, the system may perform the biometric comparison locally and generate a zero-knowledge proof (e.g., using zk-SNARKs or Bulletproofs) that certifies the match score exceeded a defined threshold (e.g., 95% similarity). For example, an embodiment may use zk-SNARKs when a general-purpose proof for complex processes (like full identity verification) is needed and use Bulletproofs when proving numeric properties (like "greater than" or "within a range") is needed. The proof, along with a hash of the input data and a timestamp, may be included in the consent certificate or embedded as part of the cryptographic binding. A verifier receiving the signature token can then validate the ZKP using a public verification key, confirming that the biometric validation step was completed successfully without ever accessing the original face data. Similar ZKPs can be generated for other conditions, such as proving that the user consented to a document containing specific clauses or that their IP address was within a compliant jurisdiction, by designing domain-specific circuits or using generalized zk-friendly hash functions. This allows for highly secure, privacy-preserving validation of consent events.

In one example, after validating the user's identity, such as through facial recognition or voiceprint comparison, the method 100 may compute a confidence score indicating the strength of the match. Rather than storing or transmitting this raw biometric data or score, the method 100 includes generating a zero-knowledge proof attesting that the score exceeds a predefined threshold, such as 95%. The proof may be generated using a zk-SNARK protocol or similar zero-knowledge framework and is bound to the consent certificate or included in the signature token. During later verification, the method may allow a relying party to validate the proof using a public verification function, confirming that identity verification occurred within required parameters, without revealing the underlying biometric inputs or computed score.

In some embodiments, the at least one consent artifact may include biometric data, such as a facial recognition hash, voiceprint, iris scan, or fingerprint data. These biometrics may be captured using a user's camera or microphone during the session and transformed into cryptographic hashes or vectors that are included in the consent certificate. The use of biometrics helps link the consent action to a specific, physical individual, increasing the reliability of the consent verification process.

The plurality of identity verification artifacts may also include biometric artifacts, either matching or separate from those used in the consent artifact. For instance, the system may validate identity by comparing a scanned ID photo with a live selfie or by matching a stored voiceprint with a newly captured one. These biometric artifacts may be verified through local computation or external identity services and may be stored as encrypted components within the consent certificate.

In some embodiments, the identity verification artifacts may further include environmental information. This data may be automatically collected at the time of consent and recorded within the certificate to support later verification that the consent event occurred under valid and expected conditions.

Environmental metadata refers to data that describes the circumstances and environment in which the consent was given such as device type, operating system version, IP address, geolocation, browser fingerprint, network characteristics, local time zone, or background details in a user's video or audio file. This information may help confirm that the action was taken in a familiar or compliant context. For example, confirming that the user's device matches a previously trusted configuration, that the IP address originates from an allowed jurisdiction, or that the session occurred within a regulated timeframe may all contribute to the strength of the consent record.

Environmental and contextual data may be captured during the consent event to enhance the reliability, uniqueness, and auditability of the generated consent certificate. Such data may include, but is not limited to, gyroscope and accelerometer readings (to confirm handheld device orientation), ambient light sensor values (to assess environmental authenticity), nearby Bluetooth or Wi-Fi signal identifiers (to triangulate location in mobile contexts), battery level and charging state (to provide forensic insight into device behavior), keyboard input cadence (keystroke dynamics) for behavioral profiling, and network characteristics such as connection type, signal strength, or proxy/VPN usage. These environmental signals may be collected passively or with user consent and embedded as structured metadata within the consent certificate. When cryptographically bound to the consent artifacts and identity verification data, this contextual layer reinforces the integrity of the consent event and supports advanced validation techniques such as anomaly detection, fraud prevention, and regulatory compliance assessment.

Storing environmental metadata within the consent certificate may be implemented as a structured set of fields, such as a key-value map or a JSON object. During later verification, this data may be used to evaluate whether the consent was obtained under expected or authorized conditions. For instance, a relying party may review the certificate and confirm that the user signed from a known device, during working hours, and from a location permitted under applicable policies or regulations. In some embodiments, this metadata may also feed into other components, such as intent scoring algorithms or fraud detection heuristics. For example, flagging unusually short response times, unexpected IP geolocation, or a mismatch between declared and actual time zones may be detected by utilizing this metadata. By embedding and optionally signing this metadata as part of the consent certificate, the surrounding context of consent may be preserved and may be independently verified without additional system access or logs. For example, a user named Albert may provide consent to authorize the sharing of financial documents through a web-based platform. The system records environmental metadata at the time of consent, noting that Albert accessed the platform from his usual IP address, using a registered laptop, and within standard business hours. This data is embedded in the consent certificate. Later, when a bank verifies the signature token, it confirms that the environmental conditions match prior interactions and fall within expected norms, thereby increasing confidence in the authenticity of Albert's consent without needing to re-engage him directly.

In some embodiments, the environmental information may specifically include device information associated with the user, such as a device ID, browser fingerprint, or hardware token signature. This data can be used to link the consent action to a known, previously registered device or to flag anomalies such as a consent attempt from a new or suspicious device, adding a layer of behavioral analysis and fraud prevention.

In some embodiments, validating the identity of the user may include computing a confidence score using a trained neural network model that evaluates biometric and contextual data. The neural network may be trained on labeled identity verification datasets comprising facial vectors, voiceprint hashes, document image features, and environmental metadata (e.g., location consistency, device fingerprinting). When a consent session is initiated, the system extracts feature representations from the user-provided identity verification artifacts and consent artifacts, such as embeddings from a facial recognition model or acoustic feature vectors from a voice sample. These features are then input into the trained model, which produces a numerical output representing the likelihood that the consent interaction was initiated by the genuine user. This confidence score may be used as a threshold gate for proceeding with certificate generation or as a quantitative signal embedded in the consent certificate itself.

The neural network may be deployed as part of a local model running on the consent platform or as an API endpoint managed by a verification service. The model architecture may be a convolutional neural network (CNN) for image-based inputs, a recurrent or transformer-based model for temporal voice features, or a hybrid ensemble designed to combine multimodal inputs. To ensure privacy and model integrity, input features may be processed in a privacy-preserving format such as anonymized embeddings or homomorphically encrypted vectors. The resulting score may be normalized or calibrated based on known confidence thresholds and compared to policy-based acceptance criteria. This automated, machine-learned evaluation provides a robust, repeatable, and highly scalable identity validation method that surpasses manual review or rule-based systems in both accuracy and auditability.

In some embodiments, the consent artifact may include behavioral indicators that reflect affirmative user intent. These signals may be captured passively during the interaction and analyzed to generate an intent score or flag anomalous behavior. Inclusion of behavioral data may serve to strengthen the claim that consent was actively and knowingly provided, rather than inadvertently or under coercion. Rather than treating consent as a binary action (e.g., clicked or not), this approach seeks to reflect the quality or confidence of the interaction based on observed behavior and contextual signals. This score may be used to enforce higher standards of evidence in regulated workflows, flag anomalous or potentially coerced sessions, or drive downstream verification decisions. For example, an institution verifying consent for a financial transaction or medical release may choose to require a minimum threshold score to confirm compliance with internal or legal policies.

The intent strength score may be based on a weighted combination of factors observed during the consent session. These may include, for example: (i) interaction dwell time (e.g., how long the user reviewed the consent document), (ii) mouse or touch gestures (e.g., hesitation, erratic movement, or confirmation patterns), (iii) speech analysis (e.g., tone, hesitation, and keyword match from a verbal declaration), (iv) facial expression cues from video capture (e.g., presence of nodding or confusion), and (v) consistency across biometric checks (e.g., whether the user matched a stored profile confidently). Each factor may be normalized and assigned a confidence score, and the final intent strength score may be calculated using a simple linear model, rules-based heuristic, or trained machine learning classifier. The resulting score may be stored as a numeric value (e.g., 0-100), a category (e.g., "high," "medium," "low"), or a binary pass/fail flag, and may be embedded as part of the consent certificate to support future validation decisions.

In low-assurance contexts such as routine user agreements or platform acknowledgments, a simplified intent strength score may be based on readily observable interaction patterns. For example, a high intent score may be assigned if the user remains on the consent screen for a minimum duration (e.g., 10 seconds), scrolls through the document fully, and provides a matching voice or typed confirmation. Conversely, skipping the disclosure entirely, failing to engage with required prompts, or inconsistencies between verbal and interface actions may reduce the score. This rules-based scoring can be implemented using simple conditional logic and thresholds and may be applied without the use of machine learning or advanced behavioral models. The resulting score, such as a binary "affirmative/uncertain" flag or a percentage confidence level, may be included in the consent certificate to signal that basic indicators of intent were met during the interaction, even in the absence of full biometric or environmental verification.

In some embodiments, the method 100 may utilize one or more external identity verification services to support or augment the validation of a user's identity before generating 106 a consent certificate. These services may provide higher-assurance identity checks by comparing submitted credentials such as government-issued IDs, biometric data, or official records against verified databases or national ID registries. Integrating with these providers helps establish trust in high-risk or regulated scenarios, such as remote notarization, financial onboarding, or cross-border consent. The method may call these services during the identity validation 104 to ensure the person providing consent meets the identity requirements of the requesting party. Integration may be performed by transmitting identity artifacts such as an ID scan, facial image, or phone number to a third-party identity verification provider using a secure, authenticated API. The provider returns a response that may include a verification result, a confidence score, and optionally, a reference ID or audit trail URL. This response is then evaluated to determine whether to proceed with generating 106 the consent certificate. If the identity check passes, the verification result and any relevant metadata (e.g., timestamp, provider name, verification code) may be embedded into the consent certificate or used in downstream scoring. The method may also optionally include this information in the signature token to support future validation. A failed or incomplete identity check may halt the consent flow or trigger a fallback verification path, such as manual review or additional biometric confirmation.

In some embodiments, the method may include the ability to record a revocation request associated with a previously issued signature token. The revocation request may originate from the same user who initially consented, from an authorized agent, or from an automated policy trigger (e.g., expiration, withdrawal of third-party permissions). Recording a revocation entry may include first validating the identity or authority of the revoking party, and optionally confirm that the request pertains to an active or valid consent certificate. A revocation entry may take the form of a structured data record containing the token identifier, timestamp of revocation, reason code, and a cryptographic reference (such as a hash) to the original consent certificate or token. The entry may be digitally signed or time-anchored to ensure its integrity and non-repudiation.

The revocation entry may then be stored in a lookup structure or revocation registry that can be queried during any subsequent validation of the corresponding signature token. In some implementations, the revocation entry may be propagated to relying parties via push notification or included in a distributed ledger, allowing external systems to independently confirm that the consent represented by a particular token has been withdrawn or limited. During downstream validation, the presence of a matching revocation entry may override or nullify the effect of an otherwise valid consent certificate. This allows the system to support dynamic consent models, regulatory compliance (e.g., right to withdraw), and secure rollback of previously granted authorizations, without compromising the cryptographic integrity of the original record.

Revocation entries may be published to a blockchain or permissioned distributed ledger to ensure public auditability and tamper resistance. In such implementations, once a revocation request has been validated and a revocation entry is generated, a cryptographic hash may be computed, optionally including a reference to the original signature token, a timestamp, and revocation metadata, and submitted as a transaction to the blockchain. This operation may provide a time-stamped, immutable record that can be verified by any third party without requiring access to the revocation issuer's internal systems. The revocation entry may be stored either on-chain (as a small payload or hash) or off-chain with the blockchain containing a pointer and proof (e.g., IPFS CID or content-addressable URI).

To verify whether a particular signature token has been revoked, a relying party may query the blockchain for entries referencing the token's identifier or hash. If a revocation entry is found, its authenticity can be confirmed by re-computing the hash from the off-chain metadata or using cryptographic proofs (e.g., Merkle inclusion proofs if stored in batched revocation trees). This approach enables distributed consent validation, ensuring that even in the absence of centralized authority, validators can determine whether a token remains active or has been withdrawn. It may be particularly valuable in cross-jurisdictional or federated systems where trust must be established across organizational boundaries and where long-term verifiability and legal traceability are required.

In an example of the method 100, consider a scenario where a person named Alex is asked to electronically sign a rental agreement from a landlord Jamie using a secure digital platform. First, the platform prompts Alex to provide consent artifacts—this includes a live selfie taken through the webcam, a short video where Alex states their name, the date, and confirms they intend to sign the lease, and a drawn signature captured via touchscreen. These elements together represent the user's consent artifacts.

Next, the platform collects identity verification artifacts, such as the front and back images of Alex's government-issued ID, the IP address and device ID from which Alex is accessing the platform, and a voiceprint from the video that is compared against the ID photo using facial recognition. These multiple identity checks are used to validate that the person signing is indeed Alex.

Once Alex's identity is verified, the system generates a consent certificate. This certificate pulls together all of the key information: the lease document Alex is signing (the verification request), the identity verification artifacts (ID scan, facial match, etc.), and the consent artifacts (video, selfie, signature). The certificate acts as a single, self-contained record of the consent event.

To protect the certificate and make it tamper-evident, the platform performs a binding operation. In this example, it uses a cryptographic hash and digital signature to lock the contents of the certificate into a secure signature token. This token can then be stored or sent along with the signed lease, providing a trustworthy and verifiable record that Alex not only signed the document, but did so knowingly, intentionally, and under verifiable conditions. Alex might use the signature token to prove to a municipality that he indeed resides there, while the landlord Jamie might use the signature token to prove to a bank that he is obtaining rent from his apartment investment.

Alex and Jamie have an advantage using this method over common digital signature tools as the signature token captures and preserves proof of intent, not just proof of action. In traditional systems, a simple typed name or checkbox can be difficult to defend in legal or high-stakes scenarios because it lacks supporting context. If Alex had signed the lease using a basic e-signature service, there might be no way to prove whether Alex truly understood the agreement, whether it was actually Alex who signed, or even whether the signing took place at the claimed time. In contrast, this method generates a comprehensive, verifiable record—capturing biometric input, timestamped verbal consent, and environmental data—that gives all parties confidence in the authenticity of the consent.

This approach also addresses a major limitation of centralized or identity-first systems, which often require persistent user accounts or trust in a particular platform. With Alex's lease, the landlord, Jamie, doesn't need access to Alex's account or the original signing session. Instead, the signature token itself contains everything needed for independent validation. This self-contained, portable design reduces reliance on external systems, avoids the risks of weak identity checks, and provides a much stronger foundation for remote, regulated, or high-risk transactions. In short, it transforms consent from a superficial action into a verifiable, audit-ready event.

Figure 2:
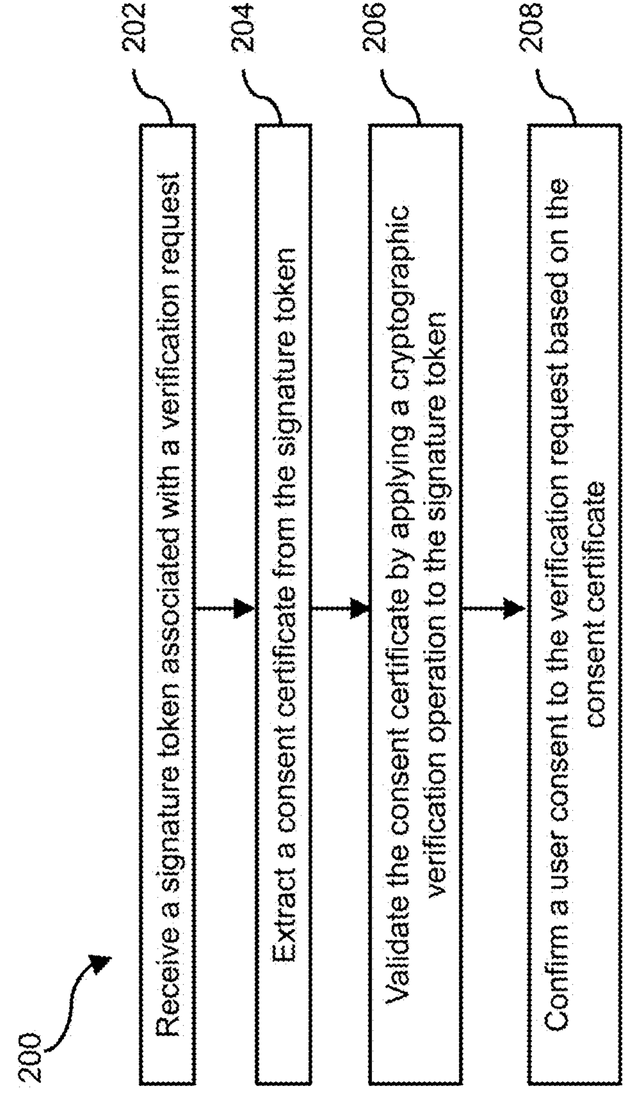
FIG. 2 is a block diagram of verifying user consent in accordance with some embodiments of the disclosure.

Referring to FIG. 2, a method 200 is provided for verifying user consent based on a previously generated signature token. The method may begin by receiving 202 a signature token associated with a verification request. This token may have been generated through a prior consent event and may be submitted by a relying party, document recipient, or third-party verifier. Upon receipt, the system extracts 204 from the token a consent certificate, which may be stored in encrypted or signed form and may include biometric, behavioral, and contextual data originally captured during the consent process. The system then applies a cryptographic verification operation to validate 206 the integrity of the consent certificate, which may include verifying a digital signature, recomputing a hash, or confirming a time-based or zero-knowledge proof. Once verified, the system confirms 208 the user's consent by evaluating the contents of the certificate in relation to the verification request. For example, the system may confirm that the user consented to the specific action or document under review, that the consent was given at a valid time and location, and that the identity and biometric indicators match. In some embodiments, selective disclosure techniques may be used, allowing only the relevant portions of the certificate to be revealed, thereby enabling privacy-preserving verification while maintaining evidentiary value.

Selective disclosure enables a third party to validate certain elements of a consent certificate, such as the user's agreement to a particular document or the time and location of consent, without accessing the user's full identity, biometric data, or behavioral record. This feature is especially useful in regulated environments, such as healthcare, legal services, or inter-organizational workflows, where only minimal information should be shared to meet a verification requirement. For example, a research institution may need to confirm that a patient agreed to share medical records but should not see the patient's biometric data or video declaration. Selective disclosure allows the system to honor such privacy boundaries while still enabling independent, cryptographically verifiable consent checks.

Selective disclosure may be achieved by structuring the consent certificate as a set of independently hashed or encrypted components. For example, each element of the certificate (e.g., timestamp, document hash, identity verification outcome, location, voiceprint hash) may be stored as a separate field, and each field may be committed using a Merkle tree structure or individually encrypted using content-specific keys. During certificate generation, the method may compute a Merkle root or generate digital signatures that cover the entire certificate. Later, when disclosure is required, the system may provide only the relevant branches of the tree, or only the decryption keys for specific fields, allowing the verifier to validate the authenticity and integrity of disclosed information without accessing concealed elements. In some cases, zero-knowledge proofs may be combined with selective disclosure to prove that hidden fields satisfy certain conditions (e.g., "the signer was located within the U.S.") without revealing exact values. This layered approach allows the consent certificate to remain both privacy-preserving and audit-capable across a range of verification contexts.

In an example, consider a scenario where Amy provides consent for medical data sharing by signing a consent certificate that includes several fields: a timestamp, a voice declaration transcript, the document hash, a location coordinate, a facial biometric hash, and device metadata. During certificate generation, the method computes a Merkle tree over these individual fields, producing a Merkle root that is cryptographically signed and bound into the final signature token. Each leaf of the tree corresponds to one field, allowing any individual field to be selectively revealed and validated later. Suppose a research institution later needs to confirm only that (i) Amy consented to the document in question and (ii) the consent occurred after a certain date. The verification system provides the institution with the document hash leaf, the timestamp leaf, and the minimal set of Merkle proof paths required to recompute the signed Merkle root. The institution can then verify that those specific fields were part of the original consent certificate without accessing the biometric data, transcript, or device information. This allows the institution to validate the authenticity of consent while preserving Amy's privacy.

In some embodiments, the method may further include verifying the identity of the user based on a plurality of identity verification artifacts and at least one consent artifact, both of which are extracted from the consent certificate. This identity verification may involve comparing biometric data, such as facial recognition vectors or voiceprint hashes, with known references, and may be supplemented with environmental or behavioral indicators. By combining multiple factors, the system enhances the confidence that the individual who initially provided the consent matches the individual referenced in the verification request, supporting high-assurance applications.

In some embodiments, the verification request itself may include a specified type of consent, indicating the nature of the user's intended authorization, such as agreement to terms, legal attestation, approval of a transaction, or release of data. During the verification process, the system may match this requested consent type against the metadata embedded in the consent certificate to determine whether the user's recorded consent aligns with the request being validated. This alignment helps prevent misuse of a consent artifact for unintended purposes.

In certain implementations, the verification request may include a defined scope of consent, which may describe parameters such as the duration of validity, the affected parties, or the specific content or transaction to which consent applies. The system may evaluate whether the scope of the originally captured consent, as reflected in the consent certificate, satisfies the boundaries outlined in the current request. This ensures that consent is being validated only within the context originally authorized by the user.

The consent certificate may include an intent strength score, which quantifies the level of certainty that the user acted with informed and deliberate intent. This score may be derived using behavioral analytics based on user interaction patterns during the consent session, such as hesitation time, consistency of biometric input, and responses to prompts. The score may be used in the verification process to support a threshold determination; for instance, consent may only be confirmed 208 if the intent strength score meets a predefined standard.

To enhance evidentiary weight, confirming 208 the user's consent may include validating a timestamped declaration contained within the consent certificate. This declaration may be an audio or video recording in which the user expressly affirms their intent, name, date, and purpose of the action. The timestamp binds the declaration to a specific moment in time, supporting the integrity of the consent event and enabling independent validation that the user provided affirmative, timely consent.

Continuing the earlier example, after visiting a telehealth platform, Alex agrees to share their medical history with a university research institution participating in a clinical study. Because the data includes sensitive health records, regulations require that Alex's consent be verifiable, context-specific, and documented in a way that can withstand later audit. During the session, the platform prompts Alex to review a disclosure, records a video statement in which Alex confirms their understanding and agreement, captures a facial biometric, and records device and location data. All of this is compiled into a consent certificate and sealed inside a signature token.

Later, the research institution receives the token from the healthcare provider and wants to verify that Alex's consent was validly obtained—not just that a box was checked or a name typed. The institution uploads the signature token to a verification portal that extracts the consent certificate and performs a cryptographic integrity check, confirming the token hasn't been altered.

The portal then examines the contents: it confirms Alex's identity verification (matching their ID to a biometric scan), checks the scope and purpose of the consent (medical data sharing for research), and validates the timestamped video declaration showing Alex affirmatively agreeing. The institution does not need to contact Alex or rely on the telehealth provider's internal records. Everything needed to confirm what was agreed to, by whom, when, and under what conditions is included in the certificate.

For the research institution, this provides confidence not just that consent was given, but that it was obtained properly, securely, and in compliance with regulatory requirements. This level of trust in the consent process is essential for legal defensibility, ethical research, and cross-institutional collaboration-something that conventional e-signature or checkbox systems cannot reliably provide.

Figure 3:
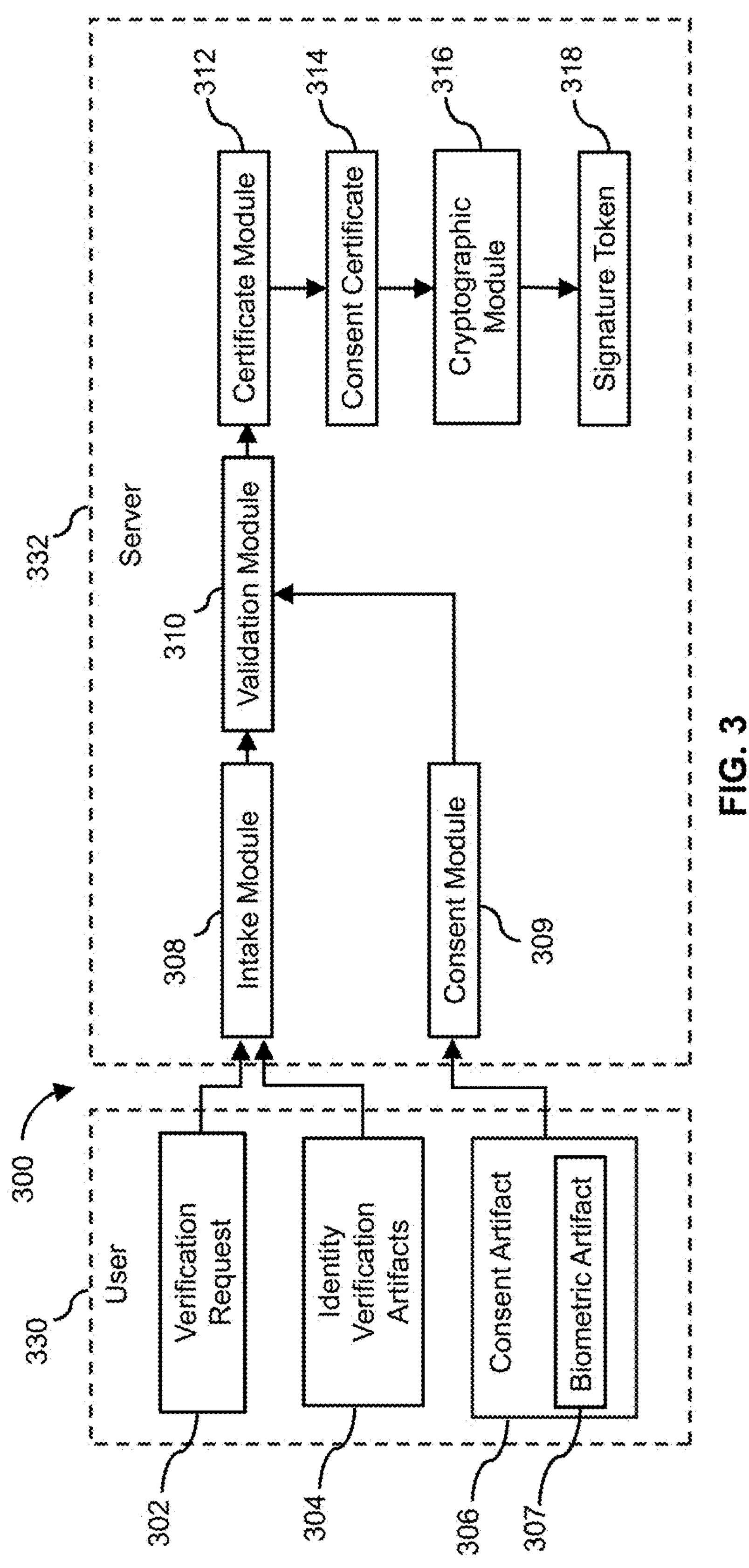
FIG. 3 is a block diagram of a system which generates a signature token in accordance with some embodiments of the disclosure.

Referring to FIG. 3, a system 300 is provided for generating a signature token that encapsulates verified user consent. The system includes an intake module 308 configured to receive a verification request 302 and a plurality of identity verification artifacts 304 associated with a user 330. These artifacts may include, but are not limited to, scanned identification documents, facial recognition vectors, voiceprints, or metadata identifying the user's 330 device or location. A consent module 309 is included to capture at least one consent artifact 306 from the user 330; the artifact may comprise a timestamped video statement, behavioral input, or biometric artifact 307, such as a facial scan or voice recording. A validation module 310 is configured to authenticate the user 330 based on the received identity verification artifacts and consent artifact. This may involve active matching processes (e.g., facial comparison, voiceprint analysis) or passive checks such as liveness detection and environmental consistency. A certificate module 312 then generates a consent certificate 314, which binds the verification request 302, identity verification artifacts 304, and consent artifact 306 into a single, portable data object. Finally, a cryptographic module 316 applies a security operation such as encryption, digital signing, or hashing to secure the consent certificate 314 and output the final signature token 318. The signature token 318 may be stored, transmitted, or used in downstream validation workflows requiring independently verifiable user consent.

The intake module 308 may expose a user interface or API through which the user 330 can submit scanned identification documents, facial images, or other identifiers. It may also extract metadata such as device type, IP address, or browser fingerprint, which are associated with the identity verification artifacts 304. The module normalizes input data, initializes session state, and ensures that downstream modules can reference the transaction context. The intake module 308 may also perform preprocessing and normalization tasks to ensure that the identity verification artifacts 304 and verification request 302 are in a usable format for subsequent modules. For example, intake module 308 may convert uploaded identification documents into machine-readable text using optical character recognition (OCR), extract facial features from images for later comparison, or validate metadata against expected formats (e.g., confirming that a document expiration date is present and valid). The module may also assign a unique session identifier to each consent transaction, enabling downstream traceability across modules.

The consent module 309 may display a request for approval—such as a disclosure, document summary, or legal clause—and capture the user's response in the form of a video, verbal statement, touchscreen signature, or other behavioral indicator. If the consent artifact 306 includes biometric elements, such as a facial scan or voice recording, these are identified as biometric artifacts 307 and may be processed accordingly (e.g., hashed or feature-extracted). The consent module 309 also timestamps the interaction and logs user input behavior, supporting downstream validation and auditability. The consent module 309 may also be responsible for enforcing structured interaction flows to ensure that the user 330 is presented with the correct legal or procedural disclosures prior to capturing a consent artifact 306. This may involve dynamically rendering user-specific consent prompts based on the verification request 302—for example, displaying a different disclosure for financial account authorization versus medical data sharing. The module may enforce interaction requirements, such as requiring the user to scroll through a document, wait a minimum amount of time, or respond to an acknowledgment checkbox or verbal prompt before proceeding. The consent module 309 may also record the sequence and timing of user actions, which may be stored alongside the consent artifact 306 to support downstream evaluation of user intent or compliance with regulatory consent protocols.

Following artifact capture, the validation module 310 authenticates the user 330 by analyzing the identity verification artifacts 304 and the consent artifact 306. This may include biometric matching (e.g., comparing a selfie to a passport photo), document validation, and checks for consistency in environmental factors (e.g., device or location). The validation module 310 may return a pass/fail determination or a confidence score that influences subsequent steps. In some implementations, the module integrates with third-party identity verification services to perform additional checks and generate audit trails. If validation fails or yields inconclusive results, fallback logic may initiate a manual review or prompt the user to re-capture missing data.

Multiple identity verification modules may be supported that can operate independently or in combination to authenticate the user before generating the consent certificate. These modules may include device fingerprinting techniques that analyze operating system characteristics, browser version, screen resolution, and installed fonts to generate a persistent device identity; IP address geolocation with regional restriction logic to ensure jurisdictional compliance; document scanning with optical character recognition (OCR) to extract identifying information from government-issued IDs such as passports or driver's licenses; and integration with third-party identity verification services for cross-referencing submitted artifacts against verified databases. Additionally, the system may support validation through single sign-on (SSO) providers using token-based authentication protocols, and may incorporate phone number-based identity matching using SIM card verification through telecommunications carrier APIs. These modules may be configured dynamically based on risk profile, jurisdiction, or consent type, and may feed into a composite identity confidence score used during the validation step.

To perform biometric matching, validation module 310 may first extract facial features from a selfie included in the consent artifact 306 using a convolutional neural network or another feature encoding algorithm, generating a biometric vector. This vector is then compared against a reference vector extracted from a scanned ID image included in the identity verification artifacts 304, using a similarity metric such as cosine similarity or Euclidean distance. The resulting match score is evaluated against a configurable threshold to determine if the comparison is sufficiently reliable. For document validation, the module may apply optical character recognition (OCR) to parse identifying details from a passport or license and cross-check these against a predefined schema for formatting, expiration, and issuing authority. Environmental consistency may be evaluated by checking the user's IP address, geolocation, and device fingerprint against known patterns or allowlists. These factors may be aggregated into a composite trust score or validation profile, which is logged and passed to certificate module 312 along with a deterministic result to inform the structure of the consent certificate 314.

Once validation is complete, the certificate module 312 generates a consent certificate 314 by binding the verification request 302, identity verification artifacts 304, and consent artifact 306 into a structured data object. The certificate module 312 organizes this information into a canonical format (e.g., a serialized JSON or binary object), ensuring that each component is fielded and logically linked. Optional metadata, such as interaction timestamps or scoring results, may also be included. The module prepares the certificate 314 for downstream cryptographic operations, either embedding it directly or referencing it via a secure hash.

To implement the binding of components, certificate module 312 may instantiate a certificate object using a predefined schema that enforces field types and required keys. Each input—such as the verification request 302, identity verification artifacts 304, and consent artifact 306—is inserted into the object under deterministic field labels, and serialized using a canonical encoder that enforces strict field ordering and consistent encoding rules (e.g., UTF-8, base64 for binary content). If subfields contain nested data, such as biometric hashes or video metadata, the module may flatten or reference them to reduce object size. To support later integrity checks or selective disclosure, the module may generate field-level digests using a cryptographic hash function (e.g., SHA-256), store these as a parallel map, and optionally construct a Merkle tree over the field hashes. In configurations where the consent certificate 314 is stored externally, the module may compute a content-addressable hash (e.g., CID) and insert a secure reference link. These steps ensure that the resulting certificate is complete, portable, and ready for applying 108 the binding operation by the cryptographic module 316.

Finally, the cryptographic module 316 applies a binding operation to the consent certificate 314, producing the final signature token 318. This may involve signing the certificate with a platform-controlled private key, encrypting it for secure transport, or computing a one-way hash for anchoring on a distributed ledger. The resulting signature token 318 may include the full certificate, or act as a reference to it, along with supporting metadata such as timestamp, version, or public key identifier. The token 318 is then returned to the relying party, stored on-chain, or delivered to the user 330, enabling downstream validation of the consent event without further dependence on the originating system.

To perform the binding operation, the cryptographic module 316 may first normalize the serialized consent certificate 314 to ensure byte-level consistency using a canonicalization function. This guarantees that the resulting cryptographic digest or signature is reproducible during future validation. For signing, the module may interface with a secure key store or hardware security module (HSM) to retrieve a platform-controlled private key, and use a digital signature algorithm such as ECDSA or Ed25519 to generate a signature over the certificate payload. The output may be appended to the certificate as a detached or inline signature, or wrapped together with the certificate and metadata to form the signature token 318. If encryption is applied, the module may use symmetric or asymmetric methods depending on whether the token is intended for a single recipient or multiple verifiers. When anchoring to a distributed ledger, the module may submit a transaction containing the hash of the certificate or the token itself, and include the resulting transaction ID or block reference in the token metadata. These steps ensure the token is tamper-evident, independently verifiable, and cryptographically bound to the original consent context.

In some configurations, the consent artifact 306 may include environmental information, such as the user's device type, operating system, browser fingerprint, IP address, or geolocation data. This environmental artifact may be captured automatically during the consent event and included in the consent certificate 314 to provide context about the user's 330 physical and digital environment. Such data can be used to verify that the consent was provided in a compliant jurisdiction or under expected access conditions, and may further support anomaly detection or forensic review in dispute scenarios.

The consent module 309 may further be configured to prompt a consent event, initiating an interaction with the user designed to solicit and capture intentional, informed consent. This may involve displaying terms or disclosures, recording a verbal or visual affirmation, or requiring the user to complete a specific action, such as clicking a confirmation button or stating their name and date aloud. In various embodiments, the prompt may be adaptive—changing based on document type, user risk profile, or compliance requirements—and may be integrated with accessibility features or multilingual support. The system may log the manner and content of the prompt, which may be stored as part of the consent artifact 306 or transcript within the consent certificate 314.

In an example, suppose Alan is applying for a remote notary service to finalize a power of attorney form. The notarization platform is powered by a system designed to generate a signature token using multiple integrated modules that operate behind the scenes as Alex interacts with the web interface.

When Alan visits the platform and uploads the document, the intake module first presents a form asking for personal information and displays a request for consent to proceed with the notarization. It also collects a verification request—in this case, the intent to authorize the power of attorney document—and simultaneously initiates the collection of identity verification artifacts. These may include a scanned government-issued ID (captured via upload), facial recognition from a live selfie (taken via webcam), and device metadata such as IP address and browser fingerprint.

Next, the consent module prompts Alan with a guided user interface asking them to complete a series of consent actions. This includes recording a short video where Alan states their name, the date, and their intention to sign the power of attorney. Alan is also prompted to draw a signature using their mouse or touchscreen. These inputs are captured as consent artifacts, and the system automatically identifies at least one biometric artifact (in this case, Alan's facial vector from the video).

The system's validation module now processes the identity verification artifacts and consent artifacts together to confirm that the individual providing consent is, in fact, Alan. It uses facial matching algorithms to compare the selfie and ID photo, checks for liveness, and validates the ID against a third-party identity verification service. If all validation checks pass, the process proceeds to the certificate module.

The certificate module compiles all relevant elements (i.e., Alan's identity data, biometric information, consent video, the verification request, device and location metadata) into a unified consent certificate. This certificate acts as a single object representing the full context of Alan's interaction with the platform.

Finally, the cryptographic module takes over to secure the consent certificate, performing a digital signature operation using a server-side private key and generating a signature token. This token is stored securely in the platform's backend and may also be emailed to Alan or made available via a verification portal. The result is a tamper-evident, portable artifact that not only proves that Alan signed the document, but that the action was verified, recorded, and cryptographically sealed by a robust backend system.

What is claimed is:

1. A method for generating a signature token for a consent event, the method comprising:

receiving a verification request of an identity of a first user;

detecting the consent event for the verification request of the identity;

receiving at least one consent artifact for the consent event, wherein the at least one consent artifact comprises information for verifying the identity of the first user and an affirmative indication of an intent to verify the identity of the first user, and wherein the affirmative indication comprises one or more user interaction patterns during the consent event;

responsive to receiving the at least one consent artifact, automatically capturing a plurality of identity verification artifacts for the at least one consent artifact received, wherein the plurality of identity verification artifacts are used to verify the identity of the first user based on the at least one consent artifact;

validating the identity based on the plurality of identity verification artifacts and the at least one consent artifact, wherein the validating includes determining an intent strength score based on the one or more user interaction patterns;

generating a consent certificate comprising a structured data object including the verification request, the plurality of identity verification artifacts, and the at least one consent artifact, wherein the consent certificate is generated based at least on the intent strength score;

embedding a cryptographic hash of the consent certificate in the structured data object;

applying a binding operation that cryptographically secures the consent certificate to the structured data object having the embedded cryptographic hash;

generating the signature token based on the consent certificate;

linking the consent certificate with a transfer of data between the first user and a second user; and validating the transfer of data for at least one additional transfer by applying a cryptographic verification operation using the signature token.

2. The method of claim 1, wherein generating the consent certificate includes linking a consent description to the consent certificate.

3. The method of claim 2, wherein the consent description includes metadata identifying a context of a consent of the first user.

4. The method of claim 1, wherein the signature token is used to prove a chain of custody of the consent certificate.

5. The method of claim 1, wherein the binding operation includes a cryptographic operation that cryptographically secures the consent certificate.

6. The method of claim 5, wherein the cryptographic operation includes a zero-knowledge proof.

7. The method of claim 1, wherein the at least one consent artifact contains at least one biometric artifact.

8. The method of claim 1, further comprising:

recording a revocation entry for the signature token.

9. The method of claim 1, wherein the plurality of identity verification artifacts includes environmental information.

10. The method of claim 1, wherein validating the identity includes computing a confidence score using a trained neural network.

11. The method of claim 1, wherein the at least one consent artifact includes behavioral indicators demonstrating consent.

12. A system for generating a signature token for a consent event, comprising:

a non-transitory memory storing instructions; and one or more hardware processors coupled to the non-transitory memory and configured to read the instructions from the non-transitory memory to cause the system to perform operations comprising:

receiving a verification request and a plurality of identity verification artifacts associated with a first user, wherein the plurality of identity verification artifacts are used to verify the identity of the first user for the consent event;

detecting the consent event for the verification request of the first user;

capturing at least one consent artifact from the first user based on the consent event, wherein the at least one consent artifact includes at least one biometric artifact, wherein the at least one consent artifact comprises information for verifying the first user using the plurality of identity verification artifacts and an affirmative indication of an intent to verify the first user, and wherein the affirmative indication comprises one or more user interaction patterns during the consent event;

authenticating the first user based on the plurality of identity verification artifacts and the at least one consent artifact, wherein the authenticating includes determining an intent strength score based on the one or more user interaction patterns;

generating a consent certificate comprising a structured data object including the verification request, the plurality of identity verification artifacts, and the at least one consent artifact, wherein the consent certificate is generated based at least on the intent strength score;

embedding a cryptographic hash of the consent certificate in the structured data object;

cryptographically securing the consent certificate using a binding operation applied to the structured data object having the embedded cryptographic hash;

generating the signature token based on the cryptographically secured consent certificate;

linking the cryptographically secured consent certificate with a transfer of data between the first user and a second user; and validating the transfer of data for at least one additional transfer by applying a cryptographic verification operation using the signature token.

13. The system of claim 12, wherein the at least one consent artifact includes an environmental artifact.

14. The system of claim 12, wherein, prior to the detecting the consent event, the operation further comprise:

providing a prompt to the first user for consenting to the consent event.

15. A non-transitory machine-readable medium for generating a signature token for a consent event, having stored thereon machine-readable instructions that, when executed by one or more processors, cause the one or more processors to perform operations comprising:

receiving a verification request of an identity of a first user;

detecting the consent event for the verification request of identity;

receiving at least one consent artifact for the consent event, wherein the at least one consent artifact comprises information for verifying the identity of the first user and an affirmative indication of an intent to verify the identity of the first user, and wherein the affirmative indication comprises one or more user interaction patterns during the consent event;

responsive to receiving the at least one consent artifact, automatically capturing a plurality of identity verification artifacts for the at least one consent artifact received, wherein the plurality of identity verification artifacts are used to verify the identity of the first user based on the at least one consent artifact;

validating the identity based on the plurality of identity verification artifacts and the at least one consent artifact, wherein the validating includes determining an intent strength score based on the one or more user interaction patterns;

generating a consent certificate comprising a structured data object including the verification request, the plurality of identity verification artifacts, and the at least one consent artifact, wherein the consent certificate is generated based at least on the intent strength score;

applying a binding operation to the structured data object that cryptographically secures the consent certificate;

generating a cryptographic hash of the consent certificate based at least on the structured data object;

embedding the cryptographic hash in the structured data object;

generating the signature token based on the structured data object having the embedded cryptographic hash;

linking the consent certificate with a transfer of data between the first user and a second user; and validating the transfer of data for at least one additional transfer by applying a cryptographic verification operation using the signature token.

16. The non-transitory machine-readable medium of claim 15, wherein generating the consent certificate includes linking a consent description to the consent certificate.

17. The non-transitory machine-readable medium of claim 16, wherein the consent description includes metadata identifying a context of a consent of the first user.

18. The non-transitory machine-readable medium of claim 15, wherein the signature token is used to prove a chain of custody of the consent certificate.

19. The non-transitory machine-readable medium of claim 15, wherein the binding operation includes a cryptographic operation that cryptographically secures the consent certificate.

20. The non-transitory machine-readable medium of claim 19, wherein the cryptographic operation includes a zero-knowledge proof.

* * * * *